United States Patent [19]

Baris

[11] Patent Number: 4,932,314
[45] Date of Patent: Jun. 12, 1990

[54] SEGMENTED PISTON

[76] Inventor: Scott L. Baris, 7225 Navajo Rd. #237, San Diego, Calif. 92119

[21] Appl. No.: 270,013

[22] Filed: Nov. 14, 1988

[51] Int. Cl.⁵ .............................................. F16J 1/04
[52] U.S. Cl. ...................................... 92/221; 92/220; 92/216; 123/193 P
[58] Field of Search ................. 92/208, 216, 217, 218, 92/220, 221, 255; 123/193 P

[56] References Cited

U.S. PATENT DOCUMENTS

| 1,368,938 | 2/1921 | Kecskemety | 92/218 |
|---|---|---|---|
| 1,553,548 | 9/1925 | Nagel et al. | 92/218 |
| 1,701,355 | 2/1929 | Borland | 92/218 |
| 1,785,903 | 12/1930 | Heiner | 92/218 |
| 2,069,437 | 2/1937 | Frank | 92/218 |
| 2,229,040 | 1/1941 | Brockmeyer | 92/218 |
| 2,323,310 | 7/1943 | Clark | 123/193 P |
| 2,361,095 | 10/1944 | Harrah | 92/218 |
| 2,409,852 | 10/1946 | Harrah | 92/218 |
| 2,478,179 | 8/1949 | Brockmeyer | 92/216 |
| 2,782,083 | 2/1957 | Hewson | 92/218 |
| 2,783,105 | 2/1957 | Kopp | 92/218 |
| 3,610,111 | 10/1971 | Dilks, Jr. | 92/255 |
| 3,667,433 | 6/1972 | Isley . | |
| 3,777,724 | 12/1973 | Kiley . | |
| 4,016,841 | 4/1977 | Karaba . | |
| 4,031,868 | 6/1977 | Karaba . | |
| 4,203,406 | 5/1980 | Smith . | |
| 4,241,705 | 12/1980 | Karaba . | |

FOREIGN PATENT DOCUMENTS

| 463260 | 2/1950 | Canada | 92/218 |
|---|---|---|---|
| 279727 | 3/1952 | Switzerland | 92/218 |
| 751569 | 6/1956 | United Kingdom | 92/218 |

Primary Examiner—Carl D. Price
Assistant Examiner—Thomas Denion
Attorney, Agent, or Firm—Henri J. A. Charmasson

[57] ABSTRACT

A split piston in an internal combustion engine, having a base rockably secured to the connecting rod, and a detachable ring head which interfaces with the cylinder wall. The detachable ring head is snugly fitted onto a cylindrical extension of the base having an axis parallel to the cylinder walls, to allow removal on the head without removal of the engine crankshaft or connecting rod. The snug fit minimizes combustion gas losses and eliminates to need for gas tight seals, while allowing removal of the head. Threaded fasteners are used to secure the head to the base.

3 Claims, 1 Drawing Sheet

SEGMENTED PISTON

FIELD OF THE INVENTION

This invention relates to reciprocating engines, more specifically to replaceable pistons in internal combustion reciprocating engines.

BACKGROUND OF THE INVENTION

The primary objectives of a replaceable piston in an internal combustion engine are to (1) withstand combustion chamber temperatures and pressures, (2) transmit combustion gas pressure forces to the connecting rod and crankshaft mechanisms without excessive leakage, (3) allow ready access to rings and seals, and (4) be easily replaceable when worn. The replaceable piston should be light weight so that it will not adversely impact maximum performance. It should also be rugged in construction, and low in cost. When the seals, rings or piston are to be replaced, a high degree of reliability is also desirable.

All of the current internal combustion engine pistons known to the applicant require removal from the engine block prior to replacement of rings, seals and disassembly from the connecting rod and crank shaft assembly to replace the piston. If the cylinder is also worn and must be rebored, or a larger bore is desired, or a larger diameter cylinder liner is to be used, a larger diameter piston head must be attached to the connecting rod.

Seal, ring and piston wear is primarily at the piston/cylinder wall interface. Although the piston/connecting rod interface is subject to motion and wear, the non-combustion gas environment and normal availability of lubricants tend to minimize wear at this interface.

Current replaceable liners and piston heads achieve some of the objectives well, but others poorly. Replacement of rings as well as the requirement to remove the piston head from the connecting rod typically requires removal of the entire engine block. New connecting rod attachment must be verified for proper position, lubrication and strength. These actions, handling of other parts, and verifications require added costs and time during replacement primarily of only the piston rings or other piston/cylinder wall interface hardware and parts. Because the entire piston and crankshaft assembly is removed and disconnected, storage and handling tends to be complex and cumbersome, limiting transport, access and use. Also, because of the complete disassembly, new seals, gaskets, pins, etc., are required, possibly adversely impacting reliability.

None of the prior art known to the applicant limits replacement hardware to the worn seals, rings or interfaces or avoids the need to remove the piston head from the connecting rod.

What is needed is a piston head which does not required extraneous disassembly to replace worn rings, seals or portions of the piston. The need for quick and convenient replacement is especially desired in a racing car environment or 2 cycle engine applications, where frequent replacements are common; and must sometimes be performed quickly in the pit in the course of a race.

SUMMARY OF THE INVENTION

The principal and secondary objects of the invention are:

To provide a means to segment the piston/cylinder interface from the connecting rod in an internal combustion engine;

To be able to replace the piston/cylinder interface segment without removing the engine block;

To be able to replace the piston/cylinder segment without disconnecting the piston head from the connecting rod; and To provide a means to seal combustion gases between segments.

These and other objects are achieved by a segmented piston having a base rockably secured to the connecting rod, and a detachable ring head which interfaces with the cylinder wall. The detachable ring head is snugly fitted onto a cylindrical extension of the base having an axis parallel to the cylinder walls, to allow removal on the head without removal of the engine or connecting rod. The snug fit minimizes combustion gas losses and eliminates to need for gas tight seals, while allowing removal of the head. Threaded fasteners are used to secure the head to the base.

DESCRIPTION OF THE PREFERRED EMBODIMENT

Figures 1, 2:
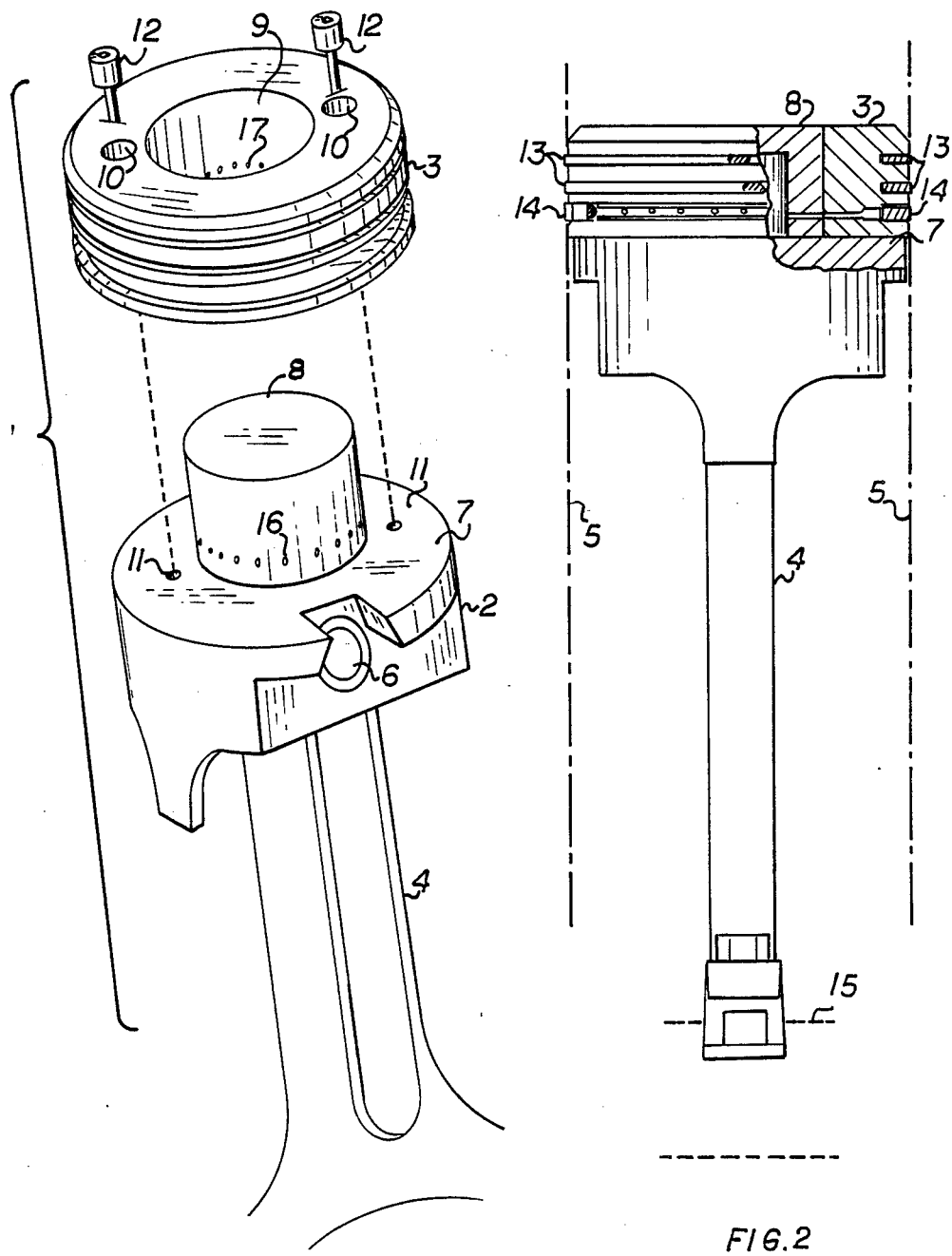
FIG. 1 shows an exploded view of a segmented piston.
FIG. 2 shows a cross sectional view of a segmented piston within a reciprocating engine cylinder wall.

The piston assembly 1 is shown in an exploded view in FIG. 1. The assembly is primarily composed of a base 2 and head 3. The base 2 is rockably attached to a connecting rod 4, which transmits the piston forces to a crankshaft assembly (see FIG. 2). The cylindrical shaped exterior of head 3 interfaces with the engines cylinder walls 5 (shown in FIG. 2). Rockable attachment of base 2 to connecting rod 4 is by means of pin 6. The base includes a platform 7 upon which head 3 rests, and a cylindrical extension 8, which snugly fits to cavity 9 of the head 3.

An alternate configuration could have the cavity 9 and extension 8 interface (snugly fit) surfaces be rectangular or conical in shape. If conical, the platform surface 7 would not be required. In the preferred embodiment, a plurality of ports for lubricants are shown in the extension 8 and cavity 9, but are not required. Spray or other means of providing lubricant can be provided to the cylinder wall/head interface.

In the preferred embodiment, attachment of the head 3 to base 2 in achieved through a pair of bores 10 in head 3 aligned with threaded holes 11 in the platform 7 of base 2. A pair of threaded fasteners or Allen head screws 12 protrude through holes 10 and are screwed into threaded holes 11 to attach head 3 to base 2 on platform 7.

In an alternate means of fastening head 3 to base 2, an interference fit between the extension 8 and cavity 9 could be provided. In this embodiment, bores 10 would not protrude to platform 7, but would be threaded to allow a wheel puller type of removal of the head 3 from base 2. Still further, the selection of materials and tolerances at the head/base interface may allow an interference fit when hot, but a sliding fit when cold, simplifying removal. The sliding fit may also allow rotation around the cylinder head axis, preventing uneven wear around the cylinder.

FIG. 2 is a cross section of the piston assembly 1 within the cylinder walls 5 of an internal combustion engine (not shown for clarity). At the interface between head 3 and the cylinder walls 5 are rings 13 and an oil wiper 14. Clearance, lengths and materials of construction can be derived from prior art piston designs. However, because of the differences in temperature and other conditions between the center of the combustion chamber (generally hotter proximate extension 8) and edges of the combustion chamber (generally cooler proximate to the head 3), different material of construction and tolerances may be used for the base 2 and head 3. The preferred embodiment, the cooler head is composed of an aluminum alloy, to obtain light weight.

The head 3 rests upon base 2 which is rockably connected to connecting rod 4. Connecting rod 4 transmits the piston forces to a crankshaft 15.

This assembly allows replacement of just a ring, rings and seals, or rings seals and a new piston head without removal from the engine block or removal of the base from the connecting rod. Allen screws 12 are removed and head 3 slips off extension 8 towards (removed) the cylinder head (not shown for clarity). New piston head can alter the geometry of the combustion chamber, if desired. Design can also be used to rotate the head 180 degrees to wear more evenly (other orientations possible in alternate embodiments having other bores).

The split piston (head and base) design has an interface that is supplied by lubricating oil through a plurality of first passages 16 in the base extension and second passages 17 in the head. First passages 16 extend from the surface proximate the connecting rod 4 to the cylindrical head interface surface of the extension 8. Second passages 17 extend from the head/base interface at the cavity 9 to proximate the wiper ring 14 and cylinder 5 at the base of the groove holding the wiper ring 14. Lubricating oil is transferred by means of capillary action from the crankshaft side of the piston to the cylinder walls. The passages also allow removal of contamination or gases.

The oil is generally prevented from being blown out from the head/base interface by high combustion pressures by the viscous oil properties, snug fit and self sealing forces at the platform surface 8, but slight amounts of oil exiting at the cylinder wall 5 serves to lubricate the sliding surface and tends to pressure balance the rings. Excess oil is removed by wiper ring 14. The cylindrical portions (skirts) of the base and piston head tend to keep the assembly from cocking within the cylinder. Skirt length/diameter ratios can be derived from prior art pistons.

An alternate configuration could include passageways at the head/base interface for the distribution of oil. Additional seals or gaskets can also be provided if excessive oil leakage is experienced. The invention can also be configured for other types of reciprocating pistons and machines, such as compressors, 2 cycle engines (such as outboard marine engines, motorcycle engines, chain saws), external combustion engines, and floating pistons. The segmented piston in these other embodiments can be easily replaced with different piston segments. These replacement segments could modify compression ratio, combustion chamber geometry and gas mixing properties, to obtain a range of performance of these machines not previously possible.

While the preferred embodiment of the invention has been shown and described, and some alternate embodiments also shown and described, changes and modifications may be made therein within the scope of the appended claims without departing from the spirit and scope of this invention.

What is claimed is:

1. In a reciprocating engine having at least one cylinder defining a combustion chamber and in which the reciprocal movement of a piston is transferred to a rotating shaft by a connecting rod, said piston comprising:
    a base rockingly attached to the connecting rod;
    said base defining a circular platform having a planar mounting surface normal to the axis of the cylinder, and a cylindrical extension integral with said circular platform and projecting coaxially with and within said combustion chamber from a central area of said mounting surface;
    said projecting extension having a diameter generally half the cross-diameter of the cylinder;
    a ring-shaped head having means for holding at least one seal-ring in sliding contact with the interior wall of said cylinder;
    said ring-shaped head having an outer diameter generally commensurate with the inner cross-diameter of the cylinder, an inner diameter commensurate with the diameter of said projecting extension, and a height commensurate with the height of said projection; and
    means for detachably mounting said head on the base by non-rotating, axial movement of the ring about the projecting extension, said means comprising a pair of fasteners passing through a pair of bores in said head and screwed into corresponding threaded bores in the base.

2. The piston claimed in claim 1, wherein the periphery of the platform mounting surface is symmetrical to the periphery of the head.

3. The piston claimed in claim 2 which also comprises:
    at least one wiper ring mounted around said head in contact with the inner surface of said cylinder;
    a first lubricating fluid passage in said base, said passage having an opening to said extension;
    a second lubricating passage in said head, having an inlet in line with said opening and an outlet on the periphery of said head; and
    means to supply lubricating fluid to said first passage.

* * * * *